O. A. KUBAT.
GLARE SHIELD.
APPLICATION FILED JAN. 26, 1916.

1,209,854.

Patented Dec. 26, 1916.

Witnesses
H. D. Kilgore
E. C. Skinkle

Inventor
Otto A. Kubat
By his Attorneys
Williamson & Merchant

UNITED STATES PATENT OFFICE.

OTTO A. KUBAT, OF OWATONNA, MINNESOTA.

GLARE-SHIELD.

1,209,854.  Specification of Letters Patent.  Patented Dec. 26, 1916.

Application filed January 26, 1916. Serial No. 74,480.

*To all whom it may concern:*

Be it known that I, OTTO A. KUBAT, a citizen of the United States, residing at Owatonna, in the county of Steele and State of Minnesota, have invented certain new and useful Improvements in Glare-Shields; and I do hereby declare the following to be a full, clear, and exact description of the invention such as will enable others skilled in the art to which it appertains to make and use the same.

My invention has for its object to provide a hand held glare shield, intended to take the place of colored glasses or goggles and to be used by occupants of automobiles or other vehicles, other than the driver, or by pedestrians to shield their eyes from the annoying lights of automobiles, at night, or the sun rays, during the day.

To the above end, generally stated, the invention consists of the novel devices and combinations of devices hereinafter described and defined in the claims.

In the accompanying drawings, which illustrate the invention, like characters indicate like parts throughout the several views.

Figure 1:
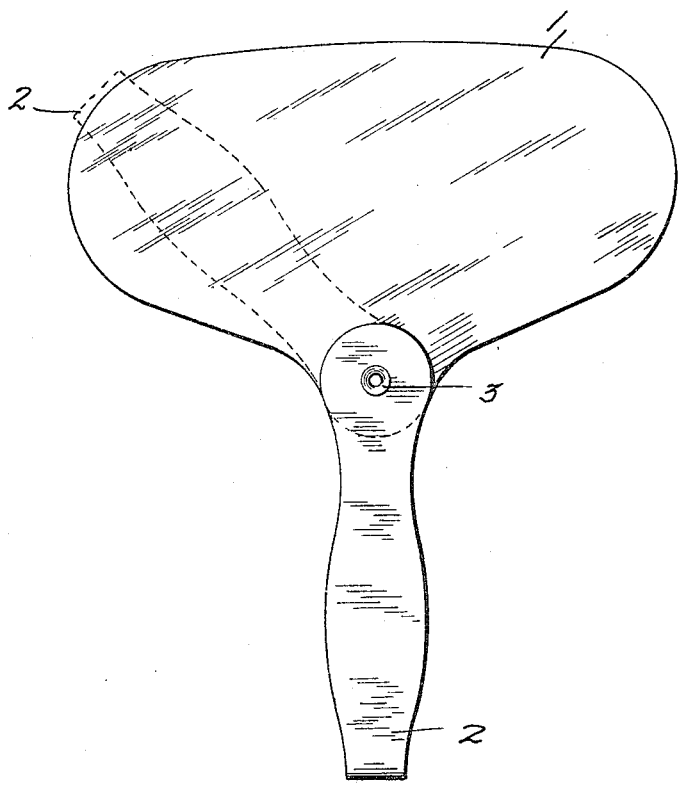
Figure 2:
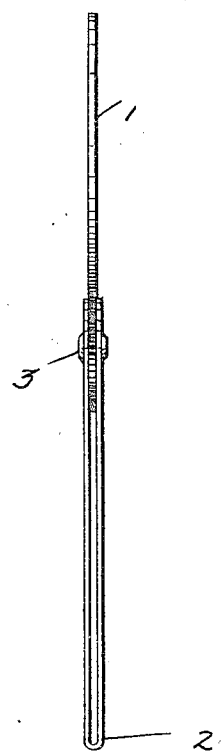

Referring to the drawings, Figure 1 is a side view of the invention illustrating, by means of broken lines, the handle turned into a position to receive the glare shield; and Fig. 2 is an edge elevation of the invention.

The numeral 1 indicates the improved glare shield, which is formed from a single sheet of flat flexible translucent material, such as celluloid, and of a color that will dim the rays of light and that is restful to the eyes. A handle 2 is provided for holding the glare shield before the eyes with the hand. This handle 2, as shown, is formed from a single piece of material doubled upon itself with its end portions embracing the glare shield 1 and pivotally and frictionally secured thereto by a tubular rivet 3. The handle 2 may be made from the same material as the glare shield 1, or any other suitable material.

By pivotally and frictionally securing the glare shield 1 to the handle 2, the same may be set at a desired angle, with respect to the handle, and held before the eyes. When the improved glare shield is not in use, its handle 2 may be turned, as shown by broken lines in Fig. 1, in which position, the glare shield 1 extends between the side members of the handle 2. With the handle turned, as indicated by broken lines in Fig. 1, the glare shield occupies very little space and can easily be carried in a pocket or other convenient place. One of the several advantages my present invention has over the ordinary colored glasses or goggles is that the same is only held before the eyes when needed. Colored glasses or goggles must be worn all of the time and are very annoying and inconvenient, especially in hot weather.

The above described invention, while extremely simple and of small cost to manufacture, has, in actual usage, proven highly efficient for the purpose had in view.

What I claim is:—

1. A glare shield formed from a single piece of flexible translucent material, and a handle pivotally secured to the lower extremity of said glare shield and frictionally held in different angular positions with respect thereto.

2. A glare shield formed from a single piece of flexible translucent material, and a handle formed from a single piece of material doubled upon itself with its ends embracing the glare shield and pivotally secured thereto.

3. A glare shield formed from a single piece of flexible translucent material, and a handle formed from a single piece of material doubled upon itself with its ends embracing the glare shield and pivotally secured to the lower extremity thereof, the body of the glare shield arranged to be turned within its handle.

4. A glare shield having a handle, said glare shield and handle being formed, each from a single piece of translucent material, the material for the handle being doubled upon itself with its ends embracing the glare shield and pivotally and frictionally secured to the lower extremity thereof.

In testimony whereof I affix my signature in presence of two witnesses.

OTTO A. KUBAT.

Witnesses:
R. J. DERNINGER,
C. L. GREENWOOD.

Copies of this patent may be obtained for five cents each, by addressing the "Commissioner of Patents, Washington, D C."